No. 895,677. PATENTED AUG. 11, 1908.
C. & E. G. PFAU.
FLUSHING TANK FOR WATER CLOSETS.
APPLICATION FILED NOV. 22, 1906.

2 SHEETS—SHEET 1.

Witnesses
Brayton S. Richards

Inventors
Charles Pfau
Edward G. Pfau
By James M. Ramsey
Attorney

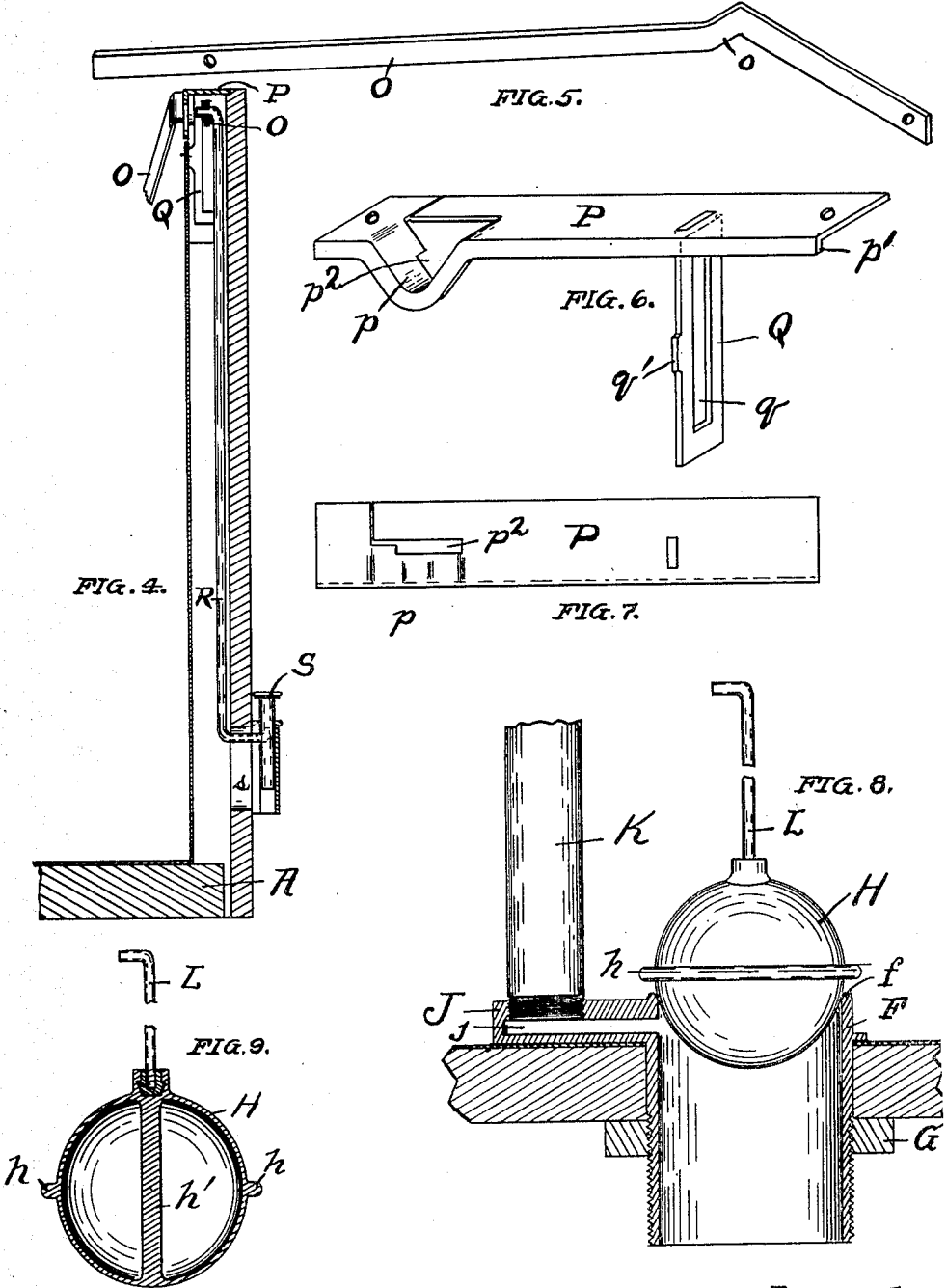

UNITED STATES PATENT OFFICE.

CHARLES PFAU AND EDWARD G. PFAU, OF CINCINNATI, OHIO, ASSIGNORS TO THE PFAU MANUFACTURING COMPANY, OF CINCINNATI, OHIO, A CORPORATION OF OHIO.

FLUSHING-TANK FOR WATER-CLOSETS.

No. 895,677.   Specification of Letters Patent.   Patented Aug. 11, 1908.

Application filed November 22, 1906. Serial No. 344,564.

*To all whom it may concern:*

Be it known that we, CHARLES PFAU and EDWARD G. PFAU, citizens of the United States, residing at Cincinnati, in the county of Hamilton and State of Ohio, have invented certain new and useful Improvements in Flushing-Tanks for Water-Closets, of which the following is a specification.

The space above the water in such tanks is generally limited, and is always limited in closed tanks, and the space which may be occupied by the tank is also often limited so that, aside from economy and neatness, it is desirable to have the tank as small as possible with the requisite water discharge.

The object of our invention is to provide an improved flushing tank for water closets of simple and economical construction and of compact size, and our invention consists in the combination and arrangement of parts hereinafter described and claimed.

Figure 1:
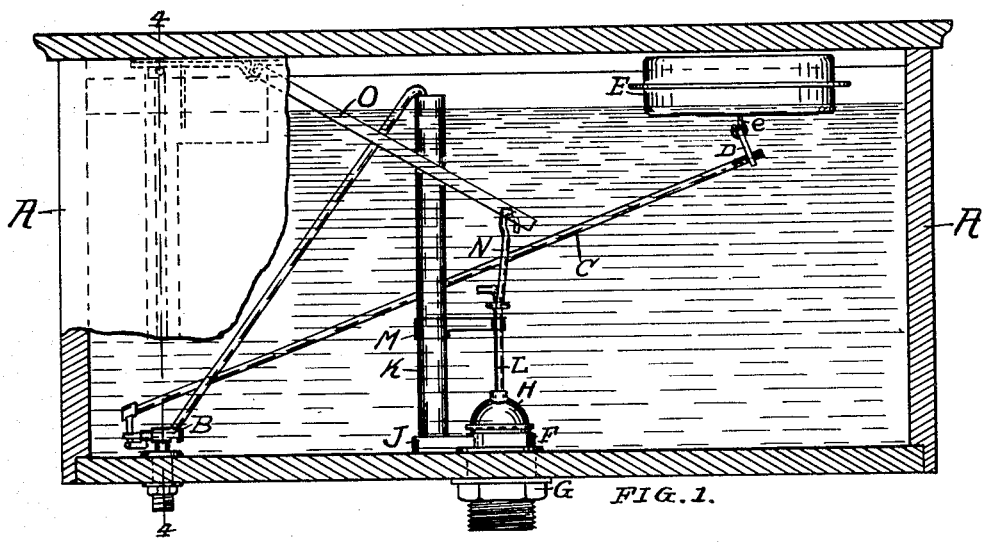
Figure 2:
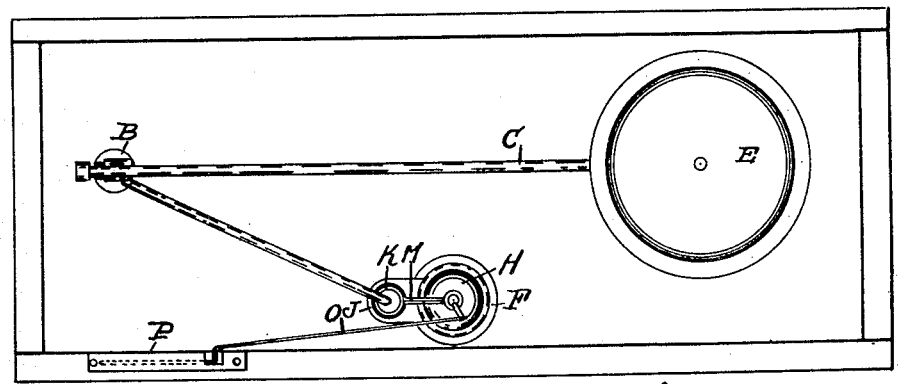
Figure 3:
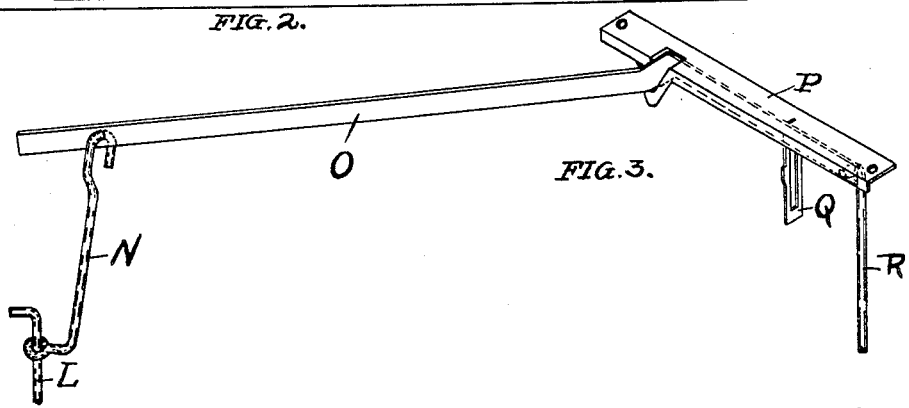

In the drawings: Figure 1 is a partial vertical section of a tank embodying our invention; Fig. 2, a top plan view of the same with the top removed. Fig. 3, a perspective view of the mechanism for operating the escape valve; Fig. 4, an enlarged section on line 4—4 of Fig. 1; Fig. 5, a perspective view of the lever for operating the escape valve; Fig. 6, an enlarged perspective view of the rest plate for the operating lever; Fig. 7, a top plan view of the rest plate; Fig. 8, an enlarged section through the escape valve, and Fig. 9, a section through the ball of the escape valve.

In the bottom of tank A, is mounted a supply valve B which may be of any of the usual or desired constructions. An operating rod C is connected with valve B in any desired manner. At its free end rod C, carries a connecting piece D screw threaded thereto and provided with an eye or opening for connection with float E. The float E is made in the form of a flat cylinder and is provided with a hook $e$ engaging connecting piece D.

It will be observed that the flat form of float will afford the required buoyancy with the minimum projection above the surface of the water in the tank, while the flexibility of the connection between the float and the operating rod permits the float to always ride on the surface of the water with its flat dimension horizontal, notwithstanding the variations in the position of the operating rod as the water rises or falls in the tank. We are thus enabled to construct the tank with a minimum provision for space above the water therein which naturally tends toward the reduction of the size of tank giving the desired water discharge. The screw threaded connection between piece D and rod C permits adjustment of the operative length of the rod when desired.

In the bottom of tank A is also mounted an escape valve seat consisting of a cylindrical tube or pipe F passing through the bottom and secured thereto by a nut G. The bore or discharge opening of pipe A is substantially cylindrical throughout and its upper edges $f$ are rounded off just enough to support ball H without cutting it. Ball H is made of rubber or similar flexible material and is of a size to fit well within the mouth of pipe A, the line of contact being well up toward the middle of the ball as shown. Surrounding the ball at or near its middle is a projecting rib or flange $h$ which serves to stiffen the ball against collapsing and also acts as a stop to prevent passage of the ball through the valve seat in case of partial collapse or distortion. To further strengthen the ball we provide a vertical connecting piece $h^1$ which serves to prevent elongation of the ball. At one side the valve seat is provided with a casing J having the port $j$ communicating therewith and carrying the usual overflow pipe K. A refill pipe T extending from the supply valve B to the top of the overflow pipe K is provided to insure the refilling of the bowl to the proper height.

Owing to the fact that the ball H has only substantially a line contact with the edges of valve seat F, and that the ball is strengthened and stiffened against collapse or distortion by rib $h$ and connecting piece $h^1$, we are enabled to construct the valve seat to have but a small elevation above the bottom of tank A. Inasmuch as the discharge from the tank is limited by the height of the valve seat above the bottom of the tank, we are thus enabled to obtain the maximum discharge from the tank, which tends to lessen the required size of tank for a certain discharge.

The ball H is carried by a stem L running in a guide M and connected by link N with lever O. At $o$ the lever O is bent to form an angular rest which lies in the socket $p$ in the rest plate P on the tank casing. The plate P is preferably made of a single piece of metal stamped into form with a flange $p^1$ on its inner edge to stiffen it. A slot $p^2$ is made in the edge of socket $p$ to permit the insertion of lever O. Plate P carries a guide plate Q having a slot $q$ and a lug $q^1$ resting against the tank lining when in position. When in operative position the end of lever O works in slot $q$ the ends of which serve as stops to limit the movement of the lever in each direction. The wall of tank A is slotted to receive the end of lever O, plates P and Q, and the rod R which connects with an operative button S through a slot $s$. By mounting the lever O on the tank casing we are enabled to obtain the maximum capacity of the tank with the minimum amount of lining.

It will be observed that lever O and its mountings are of simple and durable construction readily mounted and operated in the limited space between the top of the water in the tank and the top of the tank.

Our invention is especially adapted and intended for use in low tanks which are provided with a top or cover as shown in the drawings, in which style of tanks it is especially desirable and often necessary, in view of limited space, to reduce the dimension of the tank as much as possible. In order to attain such a result it is necessary to combine in one tank the several features of construction and arrangement of parts as herein set forth. A limited amount of space is always required below the closed top of the tank for the water to escape through the overflow pipe K in case of breakage of the inlet valve B. By means of the special and peculiar construction and arrangement of parts set forth we are enabled to utilize this space within which to use the operating lever and flat float and by means of the special construction of valve seat F with the special construction of valve H we are able to still further enlarge the water dimension of the tank without increasing its height (or to reduce its height without decreasing its water dimension) by considerably lowering the point of outlet of the tank. The lever O is combined with float valve H to operate upon said valve seat F to discharge the water and the flat float E is designed to coöperate therewith to automatically and simultaneously prolong the flush while the water is being discharged from said tank and thereafter to refill it to its normal stage, and by means of the connection between said supply valve B and overflow pipe K, the supply valve B and outlet valve H are brought into direct combination whereby they act simultaneously with relation to each other.

While we have illustrated and described the preferred construction for carrying our invention into effect, this is capable of modification without departing from the spirit of our invention. We therefore do not wish to be limited to the exact construction set forth but

What we claim as new and desire to secure by Letters Patent is:

1. In a flushing tank the combination of an angular lever operatively mounted on the tank casing and having one of its ends operating between the casing and the tank lining and its other end operating in the tank, an escape valve adapted to be operated by the lever, and means for operating the lever.

2. In a flushing tank for water closets, the combination with a tank casing and lining, of an angular lever pivotally mounted on one wall of said tank casing and having one of its ends operating between said casing and lining, and its other end operating in the tank, a fulcrum adapted to support said lever, an escape valve adapted to be operated by the lever, and means for operating the lever.

3. In a flushing tank for water closets, the combination with a tank casing and lining, of an angular lever pivotally mounted on one wall of said tank casing and having one of its ends operating between said casing and lining and its other end operating in the tank, a fulcrum adapted to support said lever, an escape valve adapted to be operated by the lever, means for operating the lever and a guide between said casing and lining to limit the movement of said lever.

4. In a closed top flushing tank for water closets, a tank casing, a fulcrum in the casing below and adjacent to the top thereof, a lever mounted in said fulcrum, an escape valve adapted to be operated by said lever, means for operating said lever, a supply valve, a rod for operating the supply valve a flattened float adapted to lie adjacent to the closed top when the tank is in its filled condition, and means for connecting said rod and said flattened float.

5. In a closed top flushing tank for water closets, a tank casing, a fulcrum in the casing below and adjacent to the top thereof, a lever mounted in said fulcrum and having one end operating between the tank casing and lining, an escape valve adapted to be operated by said lever, means for operating said lever, a supply valve, a rod for operating the supply valve, a flattened float adapted to lie adjacent to the closed top when the tank is in its filled condition, and means for connecting said rod and said flattened float.

6. In a flushing tank for water closets, the combination with a tank casing and lining, of an angular lever pivotally mounted on one wall of said tank casing and having one of its ends operating between said casing and lining and its other end operating in the tank, a fulcrum adapted to support said lever, an escape valve adapted to be operated by the lever, means for operating the lever and a guide to limit the movement of said lever.

7. In a flushing tank for water closets, a casing having a lid, a removable lining therein, an angular lever pivotally mounted on said casing independently of the lining, and having one of its ends operating between the casing and the tank lining and its other end operating in the tank whereby the lever is adapted to operate below the lid.

8. In a flushing tank for water closets, the combination with a tank casing and lining, of an angular lever pivotally mounted on said tank casing and having one of its ends operating between said casing and lining, and its other end operating in the tank, and means adapted to engage said lever to limit the movements and keep the lever out of contact with the lining and casing.

9. In a flushing tank for water closets, a tank casing and lining, a rest plate P having a fulcrum or socket $p$ and a guide Q supported by said rest plate P between said tank casing and lining.

10. In a flushing tank the combination of rest plate P having bearing socket $p$; slot $p^2$ and flange $p^1$; lever O operating in socket $p$; guide plate Q having slot $q$ adapted to receive the end of lever O; an escape valve adapted to be operated by lever O; and means for operating lever O.

CHARLES PFAU.
EDWARD G. PFAU.

Witnesses:
JAMES N. RAMSEY,
H. SCHUMACHER.